(12) United States Patent
Escowitz et al.

(10) Patent No.: US 12,415,323 B2
(45) Date of Patent: *Sep. 16, 2025

(54) COMPRESSION-MOLDED FIBER-COMPOSITE PARTS AND METHODS OF FABRICATION

(71) Applicant: Arris Composites Inc., Berkeley, CA (US)

(72) Inventors: Ethan Escowitz, Berkeley, CA (US); Erick Davidson, Piedmont, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,955

(22) Filed: Nov. 26, 2019

(65) Prior Publication Data
US 2020/0171763 A1 Jun. 4, 2020

Related U.S. Application Data

(60) Provisional application No. 62/773,871, filed on Nov. 30, 2018.

(51) Int. Cl.
*B29C 70/34* (2006.01)
(52) U.S. Cl.
CPC ................... *B29C 70/345* (2013.01)
(58) Field of Classification Search
CPC .......... B29C 70/44; B29C 70/34; B29C 70/88
See application file for complete search history.

(56) References Cited

U.S. PATENT DOCUMENTS

| | | | | |
|---|---|---|---|---|
| 2,621,140 A | * | 12/1952 | Bitterli | B29C 70/345 264/258 |
| 2,906,656 A | * | 9/1959 | Case | B29C 70/20 156/167 |
| 3,210,230 A | * | 10/1965 | Tyhurst | B29C 70/345 156/228 |
| 3,428,518 A | * | 2/1969 | Schafer | C08F 283/01 428/378 |
| 3,641,230 A | * | 2/1972 | Jenks | B29C 70/08 264/152 |

(Continued)

FOREIGN PATENT DOCUMENTS

| | | |
|---|---|---|
| CN | 1684822 A | 10/2005 |
| WO | 2013/188347 | 12/2013 |

OTHER PUBLICATIONS

Bigg, D.M. & Preston, J.R., "Stamping of Thermoplastic Matrix Composites," Polymer Composites, vol. 10, No. 4, Aug. 1989, pp. 261-268 (Year: 1989).*

(Continued)

*Primary Examiner* — Andrew D Graham
(74) *Attorney, Agent, or Firm* — Kaplan Breyer Schwarz, LLP

(57) ABSTRACT

Fiber-reinforced composite parts include select portions containing a plurality of co-aligned fiber. The parts are fabricated by placing substantially preforms into a mold cavity to form a layup, and compression molding the layup to consolidate the preforms to provide a fiber-reinforced composite part. Different sections of the part can be derived from preforms having different shapes and different compositions.

17 Claims, 7 Drawing Sheets

(56) References Cited

U.S. PATENT DOCUMENTS

| | | | | |
|---|---|---|---|---|
| 3,655,863 A * | 4/1972 | Andersen | B29C 43/00 | 264/294 |
| 4,386,989 A * | 6/1983 | Aubry | B29C 70/083 | 156/182 |
| 4,427,482 A * | 1/1984 | Yamada | B29B 15/125 | 156/307.3 |
| 4,643,857 A * | 2/1987 | Cousin | A63B 49/10 | 264/46.6 |
| 4,783,234 A * | 11/1988 | Simonton | B29C 66/83423 | 156/555 |
| 4,784,920 A * | 11/1988 | Machida | B29C 53/04 | 428/542.8 |
| 4,791,018 A * | 12/1988 | Candle | B29C 70/345 | 428/296.4 |
| 4,804,427 A * | 2/1989 | Paul | B29C 70/50 | 156/180 |
| 4,927,481 A * | 5/1990 | McGregor | B29C 43/203 | 156/245 |
| 4,937,032 A * | 6/1990 | Krone | B29C 70/08 | 156/242 |
| 5,041,182 A * | 8/1991 | Sekiguchi | B29C 70/345 | 156/245 |
| 5,041,318 A * | 8/1991 | Hulls | B29C 65/562 | 428/57 |
| 5,053,263 A * | 10/1991 | Krone | B29C 70/08 | 428/120 |
| 5,080,851 A * | 1/1992 | Flonc | B29B 11/16 | 156/222 |
| 5,111,579 A * | 5/1992 | Andersen | B29C 43/203 | 156/222 |
| 5,192,330 A * | 3/1993 | Chang | A61F 2/30965 | 623/23.34 |
| 5,203,940 A * | 4/1993 | Krone | B29C 53/04 | 156/196 |
| 5,418,035 A * | 5/1995 | Iguchi | B29C 66/1122 | 428/119 |
| 5,462,620 A * | 10/1995 | Booher | B29C 70/025 | 156/180 |
| 5,547,629 A * | 8/1996 | Diesen | B29C 33/505 | 264/257 |
| 5,567,509 A * | 10/1996 | Gautier | B29B 11/16 | 428/36.1 |
| 5,612,125 A * | 3/1997 | Kobayashi | B29B 15/122 | 264/126 |
| 5,651,474 A * | 7/1997 | Callaghan | B29C 70/088 | 220/565 |
| 5,714,105 A * | 2/1998 | Gysin | A61F 2/30965 | 264/136 |
| 5,866,060 A * | 2/1999 | Buckley | B29B 11/16 | 264/463 |
| 6,045,906 A * | 4/2000 | McMahon | B29C 70/50 | 428/364 |
| 6,730,382 B2 * | 5/2004 | Fanucci | B29C 70/083 | 428/34.1 |
| 8,986,487 B2 * | 3/2015 | Stenbaek Nielsen | B29C 70/342 | 156/244.22 |
| 9,144,944 B1 * | 9/2015 | White | B29C 35/0288 | |
| 10,016,931 B2 * | 7/2018 | Kurtz | B29C 51/004 | |
| 10,232,532 B1 * | 3/2019 | Prebil | B29C 33/306 | |
| 10,807,319 B2 * | 10/2020 | Escowitz | B29C 70/0035 | |
| 10,953,609 B1 * | 3/2021 | Mark | B33Y 70/00 | |
| 2002/0155251 A1 * | 10/2002 | Renault | B29C 43/203 | 428/99 |
| 2003/0015827 A1 * | 1/2003 | Hinc | B29C 70/521 | 264/479 |
| 2003/0062647 A1 * | 4/2003 | Deteresa | B29C 70/08 | 264/172.14 |
| 2005/0025948 A1 * | 2/2005 | Johnson | B29C 70/086 | 428/223 |
| 2006/0165955 A1 | 7/2006 | Ruegg et al. | | |
| 2007/0175573 A1 * | 8/2007 | Fox | B29C 70/34 | 156/196 |
| 2008/0241296 A1 * | 10/2008 | Wang | B29C 70/48 | 425/130 |
| 2008/0290547 A1 * | 11/2008 | Kashikar | B29B 11/12 | 264/119 |
| 2008/0292851 A1 * | 11/2008 | Egerer | B29C 43/18 | 428/196 |
| 2010/0064946 A1 * | 3/2010 | Watson | B29C 48/914 | 108/57.25 |
| 2010/0075144 A1 * | 3/2010 | Davies | C08J 5/04 | 428/375 |
| 2010/0124659 A1 * | 5/2010 | Nelson | B29C 35/0266 | 428/411.1 |
| 2010/0196671 A1 * | 8/2010 | Sorensen | B29C 70/088 | 428/174 |
| 2010/0304170 A1 * | 12/2010 | Frederiksen | B29C 65/70 | 428/542.8 |
| 2010/0308170 A1 * | 12/2010 | Hadley | B64C 1/12 | 244/131 |
| 2010/0314028 A1 * | 12/2010 | Hedges | B29C 70/083 | 156/93 |
| 2011/0115124 A1 * | 5/2011 | Barlag | B29C 70/382 | 264/258 |
| 2011/0272536 A1 * | 11/2011 | Valembois | B29C 33/485 | 248/200 |
| 2012/0119031 A1 * | 5/2012 | Ainsworth | B29C 70/34 | 244/129.3 |
| 2013/0134621 A1 * | 5/2013 | Tsotsis | B29B 11/16 | 264/177.2 |
| 2013/0136931 A1 * | 5/2013 | James | B29C 67/246 | 428/423.1 |
| 2013/0224410 A1 * | 8/2013 | Nozawa | B29C 70/342 | 428/35.7 |
| 2013/0306233 A1 * | 11/2013 | Pini | B29B 11/16 | 156/256 |
| 2013/0330553 A1 * | 12/2013 | Johnson | B29C 66/1122 | 156/166 |
| 2014/0030459 A1 * | 1/2014 | de Rothschild | E04D 1/00 | 428/36.92 |
| 2014/0045400 A1 * | 2/2014 | Vandewalle | C08J 5/041 | 442/170 |
| 2014/0061974 A1 * | 3/2014 | Tyler | B33Y 80/00 | 264/401 |
| 2014/0110875 A1 * | 4/2014 | Khan | B29C 70/54 | 264/40.5 |
| 2014/0186588 A1 * | 7/2014 | Victorazzo | B64C 1/064 | 428/178 |
| 2014/0205831 A1 * | 7/2014 | Schneider | D06M 15/55 | 428/221 |
| 2014/0352880 A1 * | 12/2014 | Lepper | B29C 66/83221 | 156/242 |
| 2014/0361460 A1 * | 12/2014 | Mark | B29C 64/141 | 264/248 |
| 2015/0209982 A1 * | 7/2015 | Kutsuwada | B29C 70/34 | 428/57 |
| 2015/0289425 A1 * | 10/2015 | Yoshida | H05K 9/009 | 428/113 |
| 2015/0328845 A1 * | 11/2015 | Lockett | B29C 70/443 | 428/116 |
| 2015/0343716 A1 * | 12/2015 | Feeney | B29C 70/48 | 264/101 |
| 2015/0355111 A1 * | 12/2015 | Boursier | B32B 27/12 | 378/62 |
| 2015/0375457 A1 * | 12/2015 | Mark | B29C 67/0081 | 425/166 |
| 2015/0376353 A1 * | 12/2015 | Takebe | B29C 70/345 | 428/161 |
| 2015/0376946 A1 * | 12/2015 | Kurzer | E06C 1/12 | 182/194 |
| 2016/0114537 A1 * | 4/2016 | Aubele | B32B 37/10 | 156/173 |
| 2016/0207236 A1 * | 7/2016 | Tsubota | B29C 45/14344 | |
| 2016/0311165 A1 * | 10/2016 | Mark | B33Y 70/00 | |
| 2016/0319088 A1 * | 11/2016 | Saji | C08J 5/042 | |
| 2016/0345563 A1 * | 12/2016 | Fenton | B29C 65/4815 | |

(56) References Cited

U.S. PATENT DOCUMENTS

| | | | | |
|---|---|---|---|---|
| 2016/0361869 A1* | 12/2016 | Mark | | B29C 70/20 |
| 2017/0036375 A1* | 2/2017 | Gerdisch | | B29C 33/3807 |
| 2017/0051438 A1* | 2/2017 | Davies | | C08J 5/04 |
| 2017/0072656 A1* | 3/2017 | Dodworth | | B29C 70/305 |
| 2017/0120519 A1* | 5/2017 | Mark | | B29C 64/106 |
| 2017/0225767 A1* | 8/2017 | King | | B64C 3/185 |
| 2017/0232674 A1* | 8/2017 | Mark | | B33Y 30/00 |
| | | | | 264/308 |
| 2017/0232692 A1* | 8/2017 | Jansen | | B29C 33/34 |
| | | | | 264/169 |
| 2018/0001579 A1* | 1/2018 | Carlson | | B29C 70/34 |
| 2018/0036970 A1* | 2/2018 | Chmielewski | | B29C 70/521 |
| 2018/0043637 A1* | 2/2018 | Jones | | B29C 70/083 |
| 2018/0345605 A1* | 12/2018 | Escowitz | | B29C 70/345 |
| 2019/0077093 A1* | 3/2019 | Tsotsis | | B29C 33/485 |
| 2019/0168420 A1* | 6/2019 | Reese | | B29B 15/127 |
| 2019/0194404 A1* | 6/2019 | Le Corvec | | C08J 5/24 |
| 2019/0375168 A1* | 12/2019 | Van Vuure | | B29C 70/20 |
| 2020/0016846 A1* | 1/2020 | Davidson | | B29C 70/081 |

OTHER PUBLICATIONS

Authorized Officer Benoit Gasner, International Search Report and Written Opinion mailed on May 19, 2020 in PCT Patent Application No. PCT/US2019/063285.

Authorized Officer: Jamie Estelle Han (Dr), Written Opinion issued in Singapore patent application No. 11202105583T, Jul. 22, 2022, 6 pp.

Office Action issued in Chinese patent application No. 201980087946.7, Aug. 24, 2022, 14 pp. w/ translation.

Office Action issued in Chinese patent application No. 201980087946.7, Jan. 13, 2023, 11 pp. w/ traslation.

Office Action and English Translation thereof issued in Korean Patent Application No. 10-2021-7020359 on Jan. 21, 2025.

* cited by examiner

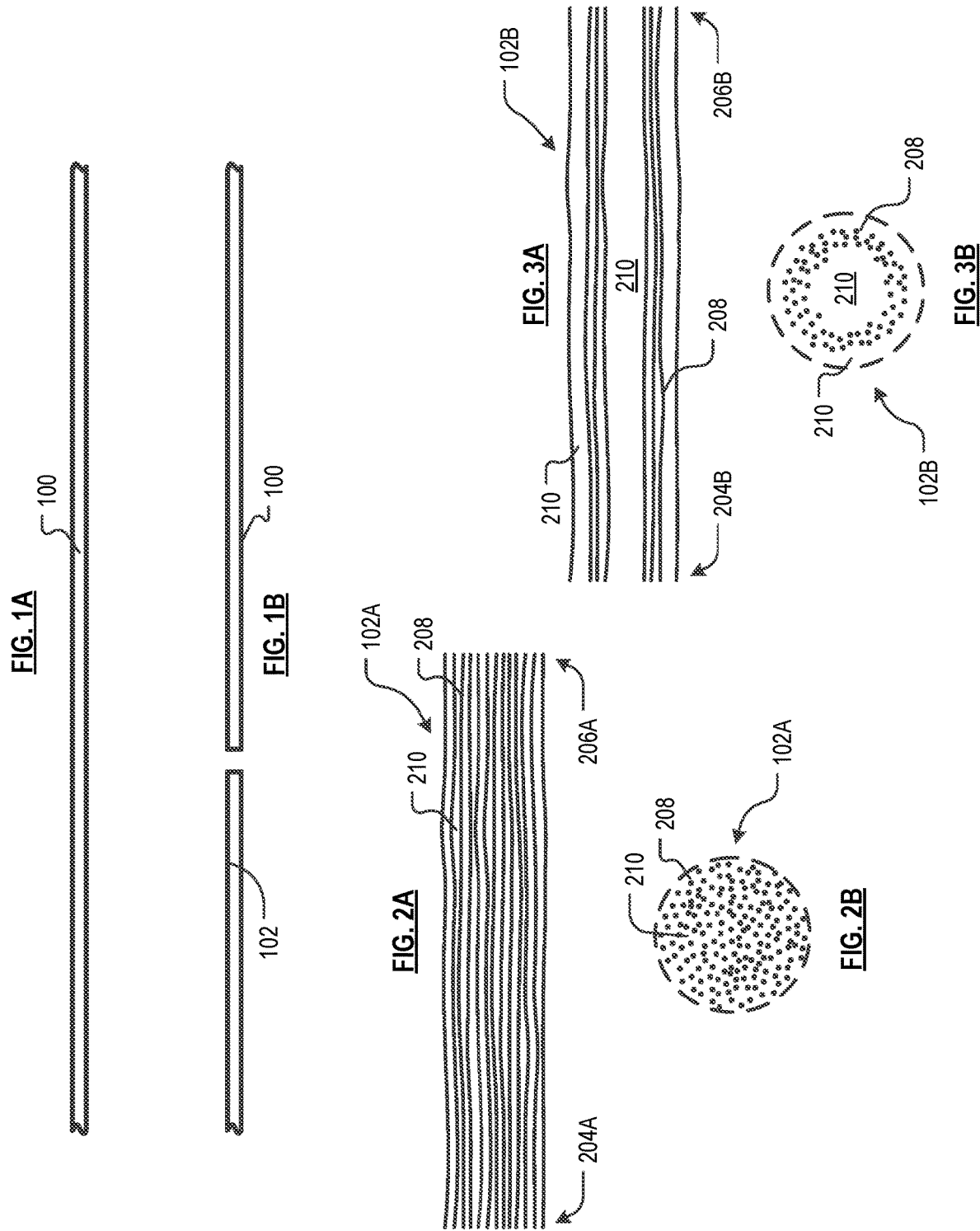

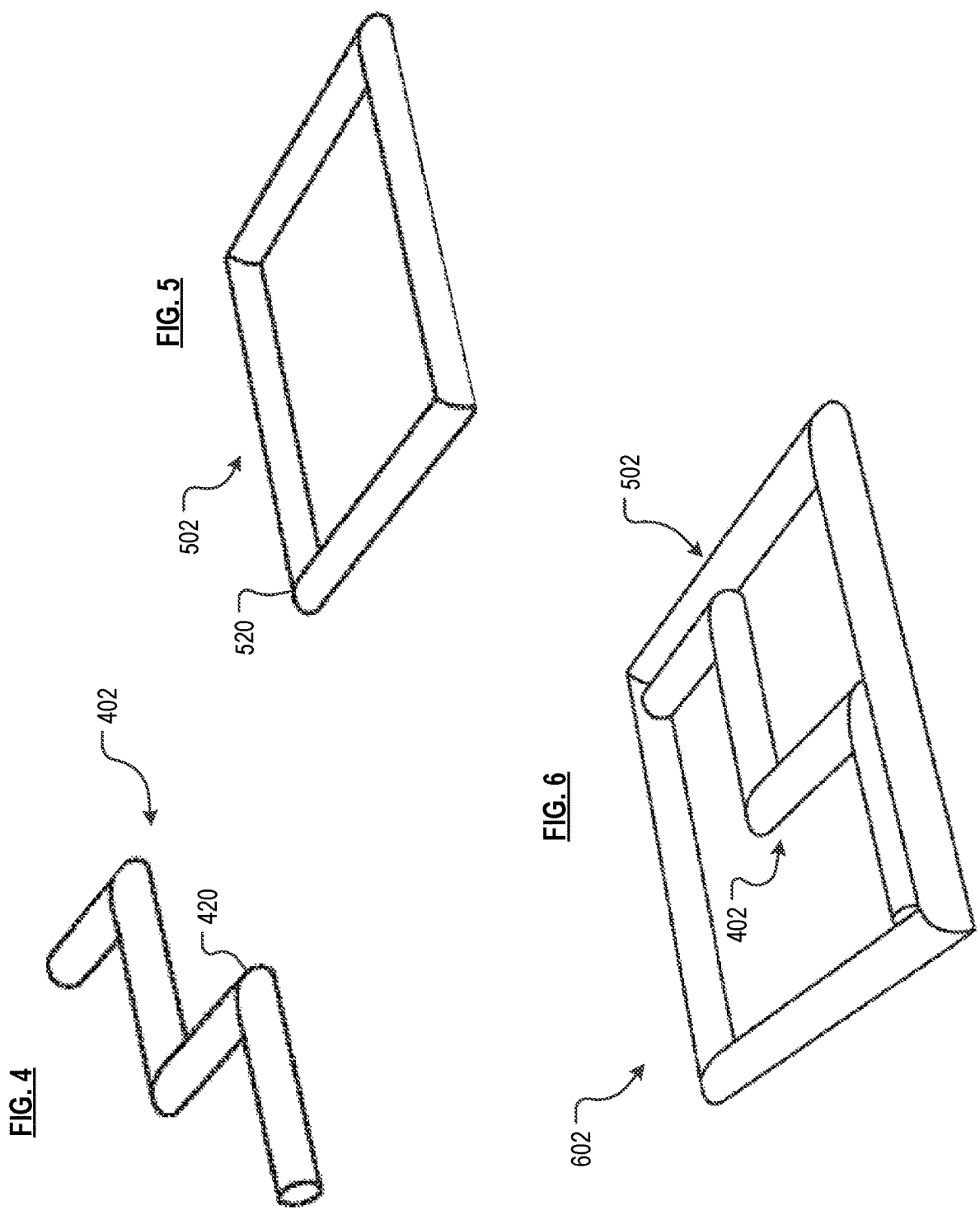

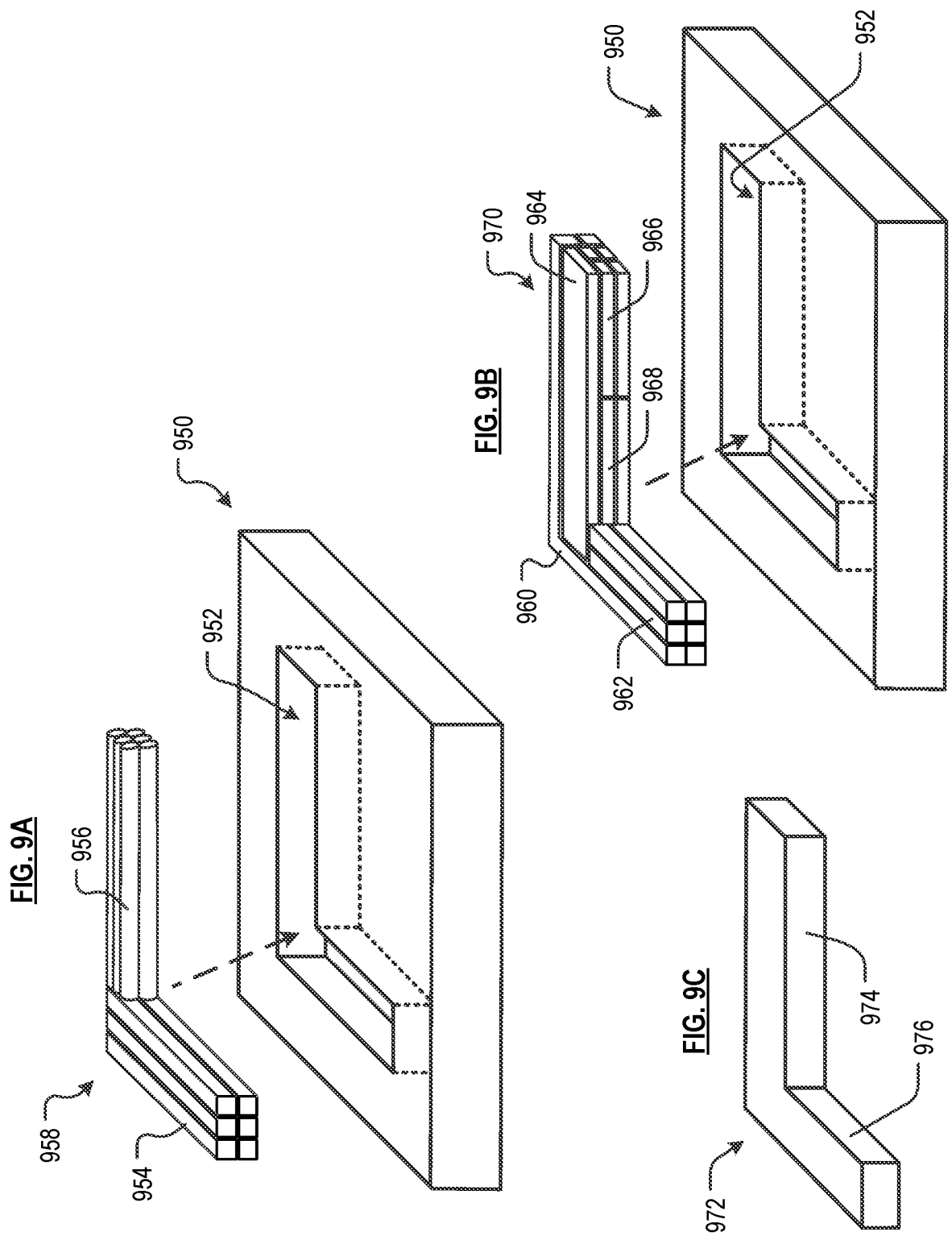

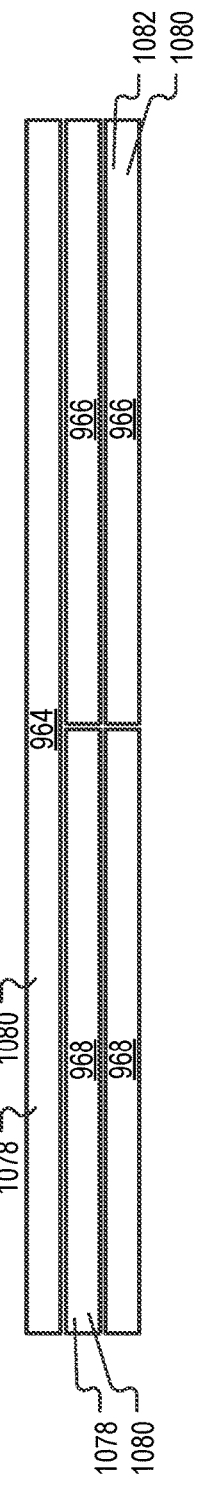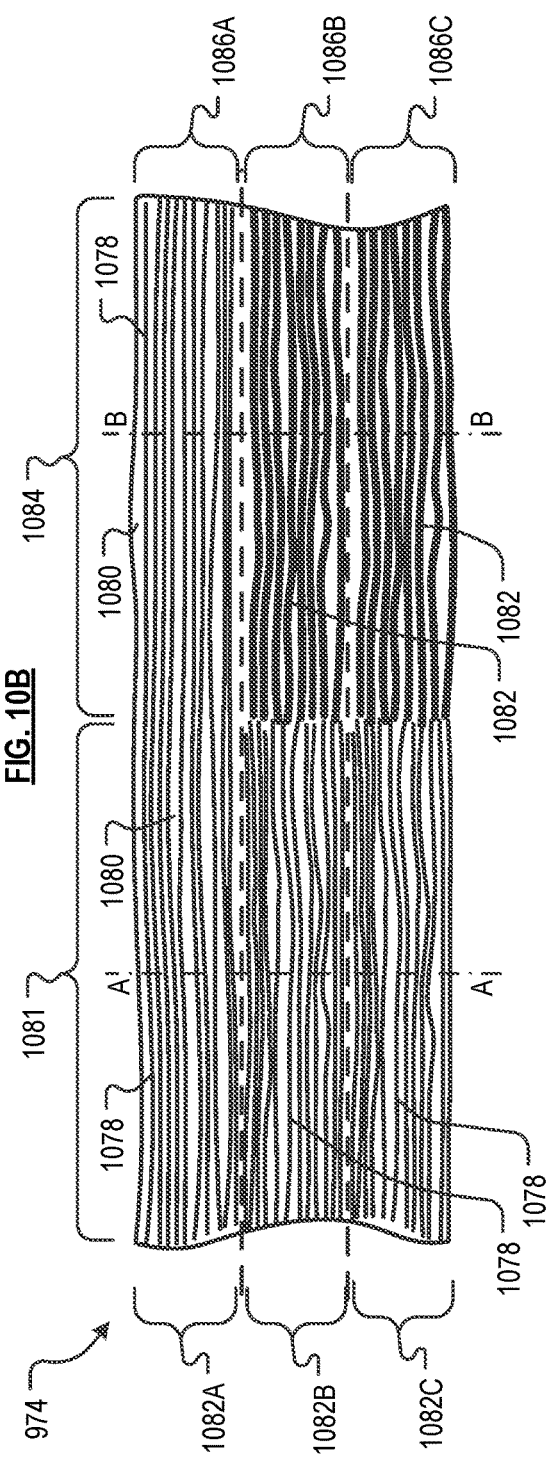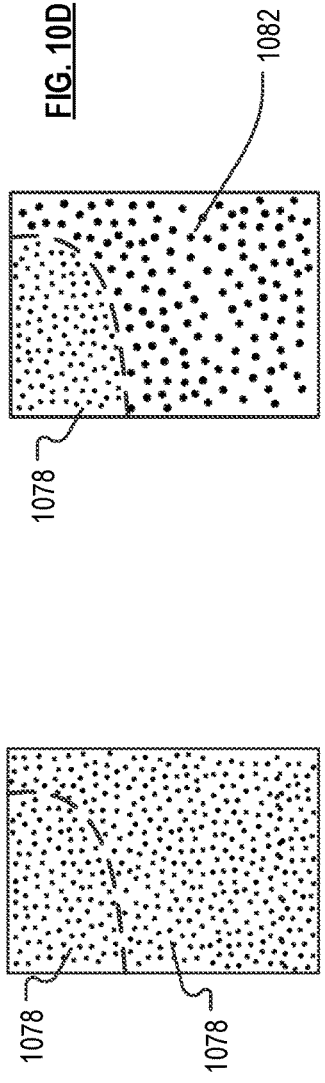
FIG. 10A
FIG. 10B
FIG. 10C
FIG. 10D

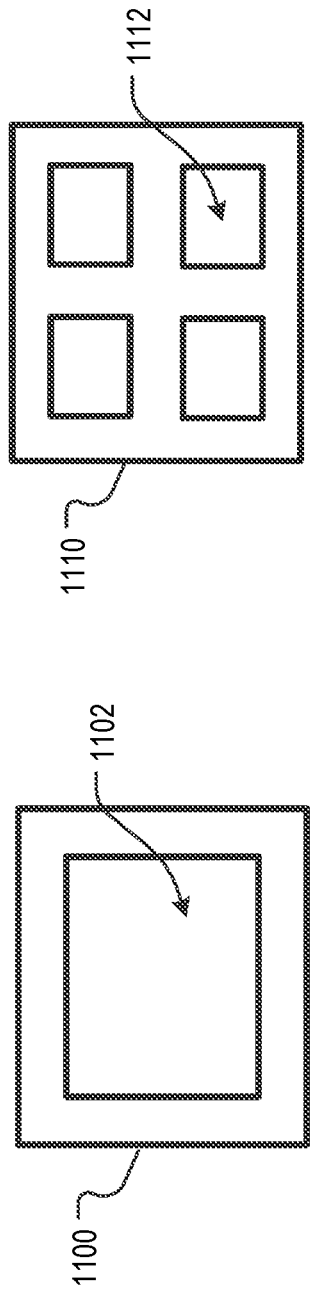
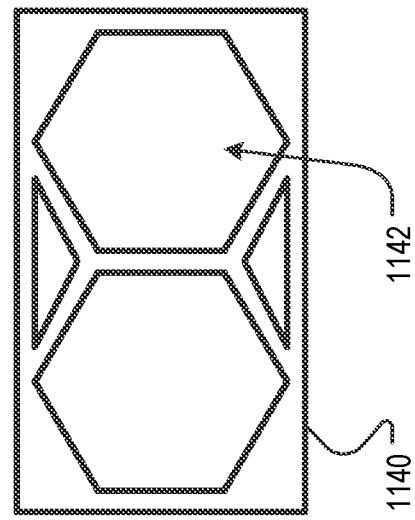
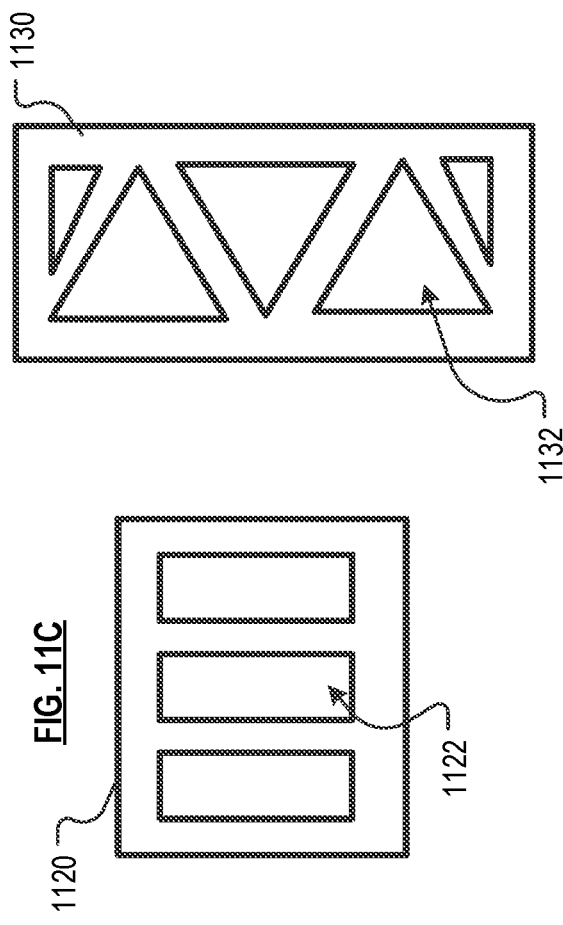
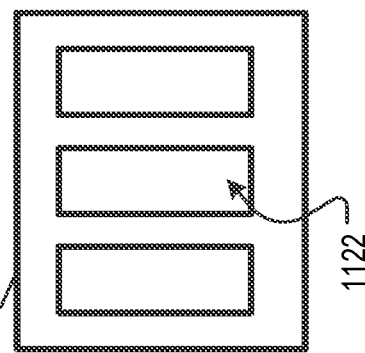

COMPRESSION-MOLDED FIBER-COMPOSITE PARTS AND METHODS OF FABRICATION

STATEMENT OF RELATED CASES

This case claims priority of U.S. Ser. No. 62/773,871 filed Nov. 30, 2018, Ser. No. 15/612,720 filed Jun. 2, 2017, and Ser. No. 15/840,826 filed Dec. 12, 2017, all of which are incorporated herein by reference. If there are any contradictions or inconsistencies in language between this specification and one or more of the cases that have been incorporated by reference, the language of this specification takes precedence and controls interpretation of the claims herein.

FIELD OF THE INVENTION

This invention relates to fiber-composite parts.

BACKGROUND OF THE INVENTION

Various manufacturing methods have been developed to produce fiber-reinforced composite parts. Present methods can be time consuming, limited to the use of certain materials, and/or constrained by part geometries. And such manufacturing methods are not suited for fabricating fiber-reinforced composite parts efficiently at high volume.

SUMMARY

The present invention provides fiber-reinforced composite parts ("fiber composites"), and a way to fabricate them that avoids some of the costs and disadvantages of the prior art.

In accordance with the illustrative embodiment, fiber composites are formed from relatively rigid, fiber-bundle-based preforms. Such preforms are formed from towpreg; that is, a preform is a sized, or sized and shaped portion of towpreg. The towpreg, and hence the preforms, contain thousands of fiber that are impregnated with a matrix material, such as polymer resin.

In a most basic embodiment, preforms have a simple linear shape (i.e., a rod). In some alternative embodiments, preforms may have any one of a variety of relatively complex shapes, including, without limitation, non-linear shapes, closed-form shapes, planar shapes, non-planar (3D) shapes, and multi-layer shapes, as appropriate for a particular mold and the part fabricated therefrom.

In accordance with some embodiments, the preforms are organized in a particular arrangement and orientation—a layup—in the mold cavity of a female mold half. The mold is then closed, and a part is fabricated via compression molding techniques (i.e., application of pressure and heat).

In some embodiments, preforms maintain their shape and location in a mold cavity to a substantial extent during the compression-molding process. Consequently, the fibers and matrix from any given preform can be directed to a desired volumetric region of a part being fabricated. In accordance with the present teachings, preforms can be made to differ in any one or more of a variety of characteristics, including, without limitation, the matrix material (e.g., different thermoplastics, different fillers, etc.), fiber type (e.g., carbon fiber vs. glass, etc.), and fiber distribution. Moreover, the fiber-bundle-based preforms disclosed herein can be bent in ways that a ribbon or sheet cannot. In light of these features, the use of fiber-bundle-based preforms as constituents of a layup provides an unprecedented ability to control fiber alignment at arbitrary volumetric locations within a part. As such, the present invention enables characteristics/attributes/properties of arbitrary regions of a part to be controlled to an extent hitherto not possible, such as to address localized stress issues, or impart different degrees of stiffness to different regions of a part, or to selectively provide electrical and/or thermal conductivity or electrical and/or thermal insulation to regions of a part.

In some embodiments, the present invention provides a method for fabricating a fiber-composite part, wherein the method comprises:
  forming a layup, wherein the layup includes a first fiber-bundle-based preform and a second fiber-bundle based preform, and wherein:
    (a) the first preform is rigid, has a first shape, and comprises a first plurality of continuous, co-aligned fibers impregnated with a first matrix material,
    (b) the second preform is rigid, has a second shape, and comprises a second plurality of continuous, co-aligned fibers impregnated with a second matrix material; and
  consolidating the first preform and the second preform in a mold cavity via the application of heat and pressure; and
  cooling the consolidated first preform and second preform, thereby providing a fiber-composite part.

In some embodiments, the present invention provides a method for fabricating a fiber-composite part, wherein the method comprises:
  forming a layup, wherein the layup includes a first fiber-bundle-based preform and a second fiber-bundle based preform, and wherein:
    (a) the first preform is rigid, has a first shape that is non-planar wherein the first shape includes two bends that are out-of-plane with respect to one another, and comprises a first plurality of continuous fibers impregnated with a thermoplastic resin matrix,
    (b) the second preform is rigid, has a second shape, and comprises a second plurality of continuous fibers impregnated with the thermoplastic resin matrix; and
  consolidating the first preform and the second preform in a mold cavity via the application of heat and pressure; and
  cooling the consolidated first preform and second preform, thereby providing a fiber-composite part.

In some embodiments, the present invention provides a fiber-composite part comprising:
  a first section at a first volumetric region of the fiber-composite part, the first section having:
    (a) a first portion, wherein the first portion comprises a first plurality of co-aligned fiber;
    (b) a second portion, wherein the second portion comprises a second plurality of co-aligned fiber;
  a second section at a second volumetric region of the fiber-composite part, wherein the first section and the second section are contiguous with one another, the second section having:
    (a) a first portion, wherein the first portion of the second section comprises the first plurality of co-aligned fiber;
    (b) a second portion, wherein the second portion of the second section comprises a third plurality of co-aligned fiber, wherein the second plurality of co-aligned fiber and the third plurality of co-aligned fiber differ from one another in a characteristic selected from the group consisting of fiber type, fiber volume fraction, and fiber distribution.

BRIEF DESCRIPTION OF THE DRAWINGS

FIG. 1A depicts towpreg for use in conjunction with embodiments of the present invention.

FIG. 1B depicts a segment of the towpreg of FIG. 1A, the segment being a linear preform.

FIG. 2A depicts a longitudinal cross-section of a first embodiment of the preform of FIG. 1B.

FIG. 2B depicts a transverse cross-section of the first embodiment of the preform of FIG. 1B.

FIG. 3A depicts a longitudinal cross-section of a second embodiment of the preform of FIG. 1B.

FIG. 3B depicts a transverse cross-section of the second embodiment of the preform of FIG. 1B.

FIG. 4 depicts an embodiment of an open form, planar, nonlinear preform in accordance with the present invention.

FIG. 5 depicts a first embodiment of a closed form, planar, non-linear preform in accordance with the present invention.

FIG. 6 depicts a second embodiment of a closed form, planar, non-linear preform in accordance with the present invention.

FIG. 9A depicts a first embodiment of a layup of preforms in accordance with the present teachings.

FIG. 9B depicts a second embodiment of a layup of preforms in accordance with the present teachings.

FIG. 9C depicts a part formed from the layup of FIG. 9A or 9B.

FIG. 10A depicts a segment of the layup of FIG. 9B.

FIG. 10B depicts a longitudinal cross-section of a region of a part formed from the segment of the layup shown in FIG. 10A.

FIG. 10C depicts a transverse cross-section along the axis A-A of FIG. 10B.

FIG. 10D depicts a transverse cross-section along the axis B-B of FIG. 10B.

FIGS. 11A-11E depict embodiments of complex open-framework parts, as can be fabricated in accordance with the present teachings.

DETAILED DESCRIPTION

Figure 7:
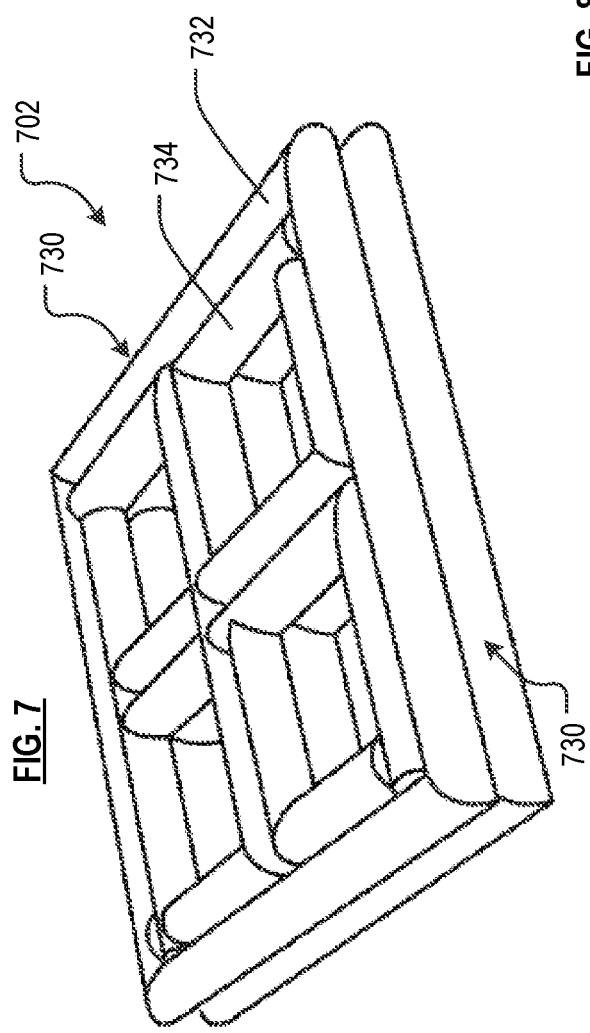
FIG. 7 depicts a third embodiment of a closed form, planar, non-linear preform in accordance with the present invention.

The following terms are defined below for use in this disclosure and the appended claims:

"Fiber composite" is a material that includes two primary components: a matrix material and a fibrous material. The fibrous material—fibers—are typically responsible for the strength of the composite, in addition to any other properties they contribute. The matrix, typically formed from a polymer resin, surrounds and supports the fibers, maintaining theft relative positions and preventing abrasion and environmental attack thereof. The combination of the fibers and resin is synergistic, with the resulting properties depending on the specific fiber, resin, and fiber volume fraction.

"Fiber" means an individual strand of fibrous material. A fiber has a length that is much greater than its diameter.

"Matrix material" is a polymer resin, typically a thermoplastic or a b-stage (i.e., partially cured) thermoset. The matrix material can also be a ceramic.

"Co-aligned fiber" refers to a plurality of fibers oriented in the same direction.

"Tow" means "a bundle of fibers," and those terms are used interchangeably herein unless otherwise specified. Tow is typically available with fibers numbering in the thousands: a 1K tow, 3K tow, 6K tow, etc. The term "filament" may also be used synonymously with "tow" herein.

"Prepreg" means fibers that are impregnated with resin.

"Towpreg" or "Prepreg Tow" means a fiber bundle (i.e., a tow) that is impregnated with resin.

"Preform" or "Filament Subunit" means a sized, or sized and shaped portion of tow/tow-preg, wherein the cross section of the fiber bundle has an aspect ratio (width: thickness) of between about 0.25 to about 6. For use herein, the terms preform and filament subunit explicitly exclude sized/shaped "tape," which typically has an aspect ratio—cross section, as above—of between about 10 to about 30. The terms preform and filament subunit also explicitly exclude sheets of fiber and laminates.

"Continuous fiber" refers to a fiber extending from one end of a preform/filament subunit to the other end thereof. In some contexts (i.e., some of applicant's other patent filings), a continuous fiber/continuous preform refers to a fiber/preform having a length that is about equal to the length of a major feature of a mold in which the fiber/bundles are placed. Continuous fiber is distinct from the "chopped fiber" or "cut fiber," as those terms are typically used in the art. Chopped or cut fiber has a random orientation in a mold and a final part and bears no predefined relationship to the length of any feature of a mold/part. A fiber-bundle-based preform in accordance with the present teachings does not include chopped or cut fiber.

"Continuous matrix" refers to a matrix that is homogenous throughout a cross-section (e.g., of a preform, of a part, of a specified region of a part).

"Lattice" refers to a framework consisting of straight or curved segments that intersect and enclose void spaces.

"About" or "Substantially" means +/−20% with respect to a stated figure or nominal value.

Additional definitions are provided in the specification in context.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Moreover, it is to be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

FIG. 1A depicts towpreg 100. The towpreg includes many individual fibers, typically provided in multiples of a thousand (e.g., 1k, 10k, 24k, etc.), which are impregnated with a polymer resin matrix. Towpreg can have any one of a variety of cross-sectional shapes, including, for example, circular, oval, trilobal, polygonal, etc.

Towpreg can be purchased from suppliers thereof, such as Celanese Corporation of Irving, Tex., or others, or formed on-site via well-known processes such as pultrusion, extrusion, or co-extrusion. In the pultrusion process, a plurality of fibers in the form of a fiber "tow" is pulled through a die and impregnated, under pressure and temperature, with a polymer (typically thermoplastic or thermoset) resin. The process provides, as indicated above, a plurality of fibers embedded within a continuous matrix material.

Referring now to FIG. 1B, fiber-bundle-based preform 102 is formed by removing a segment of towpreg 100. In FIG. 1B, preform 102 is a short, linear segment; this is a most basic embodiment of the preforms to which embodiments of the invention are directed. As described in further detail later in this specification, in other embodiments, preforms may have a more complex shape, including non-linear shapes, closed-form shapes, 3D shapes, and multi-layer shapes, as appropriate for a part being fabricated. Such preforms are, in fact, "building blocks" for fabricating fiber-reinforced parts in accordance with the present teachings.

A preform has a length that is typically substantially greater than its width and substantially greater than its thickness (note that FIG. 1B is not to scale). The length of a preform is determined based on attributes of the part being fabricated. A major influence on preform length is the size of the part. Generally, it is desirable to use the longest preform possible for any given application since a longer preform can contain longer continuous lengths of fiber. For a given part, longer continuous fibers typically result in stronger parts than shorter-length fibers. So, for a very small part, a preform might have a length of about 5 millimeters, while for a large part (e.g., an airplane wing, a vehicle body panel, etc.), a preform might have a length of many meters. Simply put, preform length is application specific.

A preform can have any suitable cross-sectional (i.e., width and height/thickness) dimensions, as appropriate for the part being fabricated. In some embodiments, the width and height (thickness) of a preform are about equal (e.g., circular cross section, square cross section, etc.). The cross-sectional shape of the preform is, in embodiments of the invention, dictated by the cross-sectional shape of the towpreg, discussed above. The shape, height, and width of a preform can be substantially constant along its length, or can vary.

It is desirable for a preform to be easily manipulated, such as for placement by robotics in a mold cavity. Consequently, the materials forming the preform should be in a state that can be readily handled (e.g., solid, rigid, etc.) at the temperature of use (typically about 20° C. to 30° C.). Alternatively, the temperature of the preform can be altered, as necessary, to facilitate handling.

Preform Composition. It is to be understood that the composition/internal structure of a preform is identical to that of the towpreg from which it is sourced.

Regarding the fibers, the individual fibers in towpreg 100 can have any diameter, which is typically, but not necessarily, in a range of about 1 to about 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be solid or hollow core. Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminosilicate, calcium silicate, rock wool, boron nitride, silicon carbide, and combinations of any of the foregoing. Furthermore, carbon nanotubes can be used. Within an individual preform, all fibers typically have the same composition.

With respect to the matrix material, any polymer resin—thermoplastic or thermoset—that bonds to itself under heat and/or pressure can be used. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy. In some embodiments, a ceramic can be used as the matrix matrix.

The suitability for use of any particular polymer resin depends, at least in part, on the requirements of the part being fabricated. Such requirements may include desired attributes/characteristics/properties of the part (e.g., aesthetics, density, corrosion resistance, thermal properties, etc.).

In addition to the polymer resin, the matrix material can include other components such as, for example and without limitation, filler, adhesion promoters, rheology control agents, colorants, and combinations of any of the foregoing.

The type and amount of filler can be selected to achieve a certain desired property such as tensile strength, elongation, thermal stability, low-temperature flexibility, chemical resistance, low density, electrical conductivity, thermal conductivity, EMI/RFI shielding, static dissipative, or a combination of any of the foregoing. Non-limiting examples of suitable fillers include inorganic fillers such as silica and calcium carbonate, organic fillers such as thermoplastic beads, electrically conductive fillers such as metal, graphite, and graphene, and low-density fillers such as thermally expanded microcapsules. A filler can have any suitable form such as bead, particles, powders, platelets, sheets, or flakes.

In some embodiments, filler includes non-aligned fiber and/or discontinuous fiber that does not extend fully between the ends of a preform. Such non-aligned fibers can include chopped fibers, milled fibers, or a combination thereof. Non-aligned fibers can include a plurality of non-aligned continuous fibers, including, for example, fiber weaves, twisted fibers, etc.

Preform Internal Structure. Preforms can have a uniform, or a non-uniform internal structure. FIGS. 2A and 2B depict preform 102A of a first embodiment of towpreg 100 of FIGS. 1A/1B. In the embodiment depicted in FIGS. 2A and 2B, preform 102A has a uniform internal structure (because the towpreg from which it is sourced has a uniform internal structure).

FIG. 2A depicts a longitudinal cross-section of preform 102A. Preform 102A is linear, which is the most basic implementation of a fiber-bundle-based preform. Preform 102A includes a plurality of fibers 208. These fibers are "continuous" since they extend from first end 204A to second end 206A of preform 102A. Furthermore, fibers 208 are "co-aligned," since they are all oriented in the same direction. Preform 102A also includes polymer resin matrix 210, which surrounds and wets fibers 208.

FIG. 2B depicts a transverse cross-section of preform 102A. In this embodiment, the plurality of co-aligned fibers 208 are substantially uniformly distributed across the transverse cross section (i.e., radially) of preform 102A.

FIGS. 3A and 3B depict preform 102B of a second embodiment of towpreg 100 of FIGS. 1A/1B. In the embodiment depicted in FIGS. 3A and 3B, preform 102B has a non-uniform internal structure (because the towpreg from which it is sourced has a non-uniform internal structure).

FIG. 3A depicts a longitudinal cross-section of preform 102B. Like preform 102A, preform 102B includes a plurality of fibers 208, which are continuous since they fully extend between ends 204B and 206B of preform 102B. The fibers in preform 102B are also co-aligned, as in preform 102A.

Referring now to FIG. 3B, and with continuing reference to FIG. 3A, it can be seen that fibers 208 are not uniformly radially distributed in preform 102B. Notably, fibers 208 are arranged in a band that is embedded with matrix 210 of preform 102B. In other words, preform 102B has a non-uniform composition in the radial direction. In some other embodiments, preforms can have other non-uniform distributions of fibers.

Preform External Architecture. FIGS. 4-8 depict several preform architectures in addition to the simple linear architecture of preforms 102A and 102B of FIGS. 2A/B and 3A/B.

FIG. 4 depicts preform 402, which is an open-form, planar, nonlinear preform in accordance with the present invention. Preform 402 is non-linear because it includes one or more bends 420. Preform 402 is planar because the bends are within the same plane. Each bend 420 can have an angle independently selected from angles in the range of 0°<bend angle 420<180°.

A nonlinear preform, such as preform 402, can be formed by heating a portion of tow-preg above the softening point of the matrix material therein and then bending the tow-preg, such as via an automatic bending tool. After the appropriate number of bends are made, the tow-preg is sized/cut, thereby creating the preform. Methods of fabricating preforms are disclosed in U.S. application Ser. Nos. 15/612,720, and 16/600,131, which are incorporated by reference herein.

FIG. 5 depicts preform 502, which is a closed-form, planar, nonlinear preform in accordance with the present invention. A closed-form preform typically comprises a single length of sized tow-preg that is bent such that the two ends thereof are situated proximal to one another, defining an enclosed region. In some embodiments, the two ends are tacked together, such as via adhesive or thermal bonding. (Preform 402 is "open form" because the two ends are not proximal to one another and do not define an enclosed region.) Preform 502 is non-linear because it includes four (i.e., one or more) bends 520. Preform 502 is planar because the bends are within the same plane.

FIG. 6 depicts preform 602, which is a combination of preform 402 and preform 502. Preform 602 is planar and non-linear, and includes both open form and closed form elements. Preform 602 can be fabricated by forming preforms 402 and 502 and then tacking them together.

Preforms characterized as "closed form," such as preforms 502, 602, and 702, are typically, but not necessarily, further or alternatively characterized as being "open-framework" or "open volume" preforms. In some embodiments, such open-framework preforms are used to fabricate "open-framework" parts, as described later in this disclosure in conjunction with FIGS. 11A through 11E.

FIG. 7 depicts preform 702, which is closed form, planar, and non-linear. Although preform 702 includes stacked elements 730, it is nevertheless considered to be planar because all bends are in the same plane or in parallel planes. Preform 702 includes two instances of element 730, each of which comprises outer square element 732 and inner square elements 734.

Figure 8:
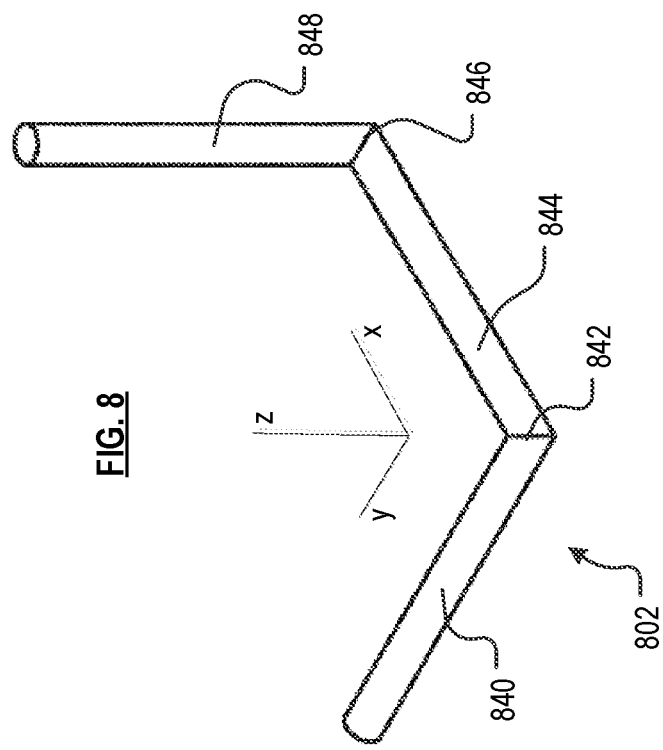
FIG. 8 depicts an embodiment of an open form, non-planar, non-linear preform in accordance with the present invention

FIG. 8 depicts preform 802, which is an open-form, non-planar, non-linear preform. Preform 802 is considered to be non-planar because at least one bend is out-of-plane with respect to another bend. In particular, bend 842 between segment 840 and segment 844 is in the y-x plane (i.e., the bend creates two segments that fall in the y-x plane) and bend 846 between segment 844 and segment 848 is in the x-z plane. Such planes are defined herein as being "out-of-plane" with respect to one another. As implied above with respect to preform 702, and as made explicit here, the characterization "out-of-plane" excludes layered or stacked elements that include "bends," wherein such stacked elements are substantially parallel (in parallel planes) to one another.

In preform 802, the bends are in planes that are orthogonal to one another. However, in some other embodiments, the bends, while being out-of-plane with respect to one another, are in planes that are not orthogonal to one another. As disclosed with respect to preform 402 of FIG. 4, the bend angle for each bend may be individually selected. Thus, bend 846 can have any angle greater than 0° and less than 180°.

Although the preforms depicted in FIGS. 4-8 depict any given bend as being defined by one non-zero vector component (i.e., along the x, y, or z axes and within the x-y, z-x, or y-z planes), in some other embodiments, a bend can be defined by any combination of non-zero x, y, or z vector components.

In some other embodiments, preforms are non-planar, non-linear, and closed form. Furthermore, non-planar, non-linear preforms can comprise non-planar, non-linear elements and planar, non-linear elements. An example of such a preform is a preform that combines, for instance, preform 502 of FIG. 5 and preform 802 of FIG. 8.

Compression Molding in Accordance with the Present Methods. As previously noted, in accordance with the present teachings, fiber-bundle-based preforms are used to fabricate a part, such as via compression molding. More particularly, in accordance with the present teachings, a part is fabricated by positioning two or more such preforms in a mold cavity, closing and thereby pressurizing the mold cavity, and raising the temperature of the contents of the mold cavity to cause the matrix material to soften to the extent that it flows "i.e., melt flow." Under such applied pressure and temperature, the two or more preforms are consolidated and, after cooling, a finished part results.

As is well known, compression molding is typically conducted at a pressure of at least about 100 psi. The temperature requirements for the process are a function of the matrix material used. For example, for a matrix comprising a thermoplastic resin, the temperature must meet or exceed the resin's glass transition temperature so that resin can flow, but must remain below its degradation temperature. For a matrix comprising a B-stage thermoset or B-stage ceramic, the matrix material must be sufficiently heated to flow, and also meet or exceed the reaction temperature of the co-reactants.

As previously noted, in accordance with the present teachings, two or more fiber-bundle-based preforms are placed in a particular arrangement and/or orientation—a "layup"—in the mold cavity. Arrangement/orientation specifics are based, at least in part, on desired overall part properties (e.g., mechanical properties, aesthetics, etc.) or the properties of a particular region of a part. During placement in the layup, the preforms retain their manufactured shape; this characteristic facilitates directing the fibers from a particular preform to a particular volumetric region of a part.

FIGS. 9A and 9B depict female mold half 950 having mold cavity 952, as well as two exemplary fiber-bundle-based preform layups 958 and 970, respectively, for use in fabricating fiber-composite part 972 (FIG. 9C) via compression molding.

Layup 958 depicted in FIG. 9A includes: (i) six linear preforms 954 having a polygonal (square) transverse cross section and arranged in two layers of three preforms each, and (ii) six linear preforms 956 having a circular transverse cross section and arranged in two layers of three preforms each. These two groupings of preforms are oriented orthogonally to one another, with one end of each of preforms 956 abutting the side of two of the stacked preforms 954.

Layup 970 depicted in FIG. 9B is a more complex arrangement than layup 958 and includes: (i) two stacked "L"-shaped (non-linear) preforms 960, (ii) four linear preforms 962 organized in two layers of two preforms each, (iii) one linear preform 964, (iv) four linear preforms 966 organized in two layers of two preforms each, and (v) two linear preforms 968 organized in two layers of two preforms each. Preforms 966 and 968 are about one-half the length of preform 964. Such different layups might be used as a function of the stresses arising in given volumetric regions of a part as a consequence of the forces to which a part is subjected in use.

In each of the two embodiments depicted, the preforms are arranged in the shape of an "L" to form the layups 958 or 970, consistent with the shape of mold cavity 952. In some embodiments, the layups are formed by adding preforms one-by-one to cavity 952, such that layup is formed within the cavity. In some other embodiments, some or all of the preforms are tacked together forming a "preform charge" prior to placement into cavity 952. In embodiments in which all preforms are assembled into a preform charge, the layup (which is then synonymous with the preform charge) is assembled and then placed as a single unit into the mold cavity.

The composition, internal structure, and external architecture of each preform placed in a mold is individually selectable, as appropriate, typically to achieve a desired attribute of a part being fabricated. For example, given a plurality of preforms in a layup, at least one preform can differ from other preforms in the following non-limiting ways:

different matrix material (e.g., two different thermoplastics, different fillers, etc.);
different fiber type (e.g., carbon fiber vs. glass, etc.);
different fiber volume fraction;
uniform vs non-uniform distribution of fibers;
linear vs. non-linear;
planar vs non-planar.

To the extent that the matrix material differs from one preform to the next in a layup, such different matrix materials must be compatible with one another. In the present context, "compatible" means that the different matrix materials will bond to one another.

Part Internal Structure. Selective positioning of fiber-bundle-based preforms that can differ from one another as described above in accordance with embodiments of the invention provides an ability to fabricate a part having different material properties in different regions of the part. This is quite advantageous since, among any other considerations, the in-use loads on a part often vary at different regions of a part, arising in different stress vectors therein. Also, designing for a certain stiffness or desired electrical properties in certain regions of a part is facilitated by the foregoing.

A part formed in accordance with the present teachings is considered to comprise two or more "sections." FIG. 10B depicts a longitudinal cross section through a segment of arm 974 of part 972 of FIG. 9C. This segment has two sections: section 1081 and section 1084. The various sections of a part adjoin each other to form the part, although such sections are not necessarily discernable as being discrete from one another upon external or internal examination of the part. That is, adjacent sections can be continuous in the sense that there might not be a distinct interface separating one section from an adjacent section. This will occur, for example, when the matrix material in adjacent sections is the same and the fibers in the adjacent sections are the same. Regardless of whether an interface is readily discernable or not, the notion of a "section" is useful for pedagogical purposes, and is used herein to refer to a volume (of a part) having a uniform composition. That is, a transverse cross-section taken anywhere along the length of a given section will exhibit substantially the same fiber and matrix composition/distribution/alignment.

In accordance with the present teachings, each section includes at least one "portion." Referring again to FIG. 10B, section 1081 is composed of portions 1082A, 1082B, and 1082C, and section 1084 is composed of portions 1086A, 1086B, and 1086C. A "portion" refers to a volume of a part derived from a particular preform. That is, a preform is the source of the fibers and matrix material for a given portion. Thus, for example, if a section is derived from two preforms, that section is considered to contain two portions. Similarly, if a section is derived from three preforms, that section is considered to contain three portions, and so forth. In such embodiments, the composition of each portion of a section is therefore determined by the composition of the preforms from which the section is derived.

As will be appreciated by comparison of FIG. 10A and FIG. 10B, there is not necessarily a one-to-one correspondence between preforms and portions. FIG. 10A depicts a segment of layup 970 of FIG. 9B. The preforms in the segment are the source of some of the fiber and matrix material that form arm 974 of part 972. This segment of the layup includes preform 964, two stacked preforms 968, and two stacked preforms 966. Preform 964 is disposed on top of the preforms 966 and 968. Preforms 964 and 968 comprise first fiber type 1078 and preforms 966 include second fiber type 1082. In this example, all preforms are assumed to comprise the same matrix material 1080. In some other embodiments, the matrix material from different preforms— and in different portions—can differ, as long as the matrix materials are compatible with one another. It is notable that the scale (thickness, in particular) of FIG. 10B is enlarged in comparison to FIG. 10A.

Co-aligned fibers 1078 from preform 964 appear in both portion 1082A of section 1081 and in portion 1086A of section 1084. Still referring to section 1081, co-aligned fibers 1078 from "upper" preform 968 appear in portion 1082B and co-aligned fibers 1078 from "lower" preform 968 appear in portion 1082C.

And in section 1084, co-aligned fibers 1082 from "upper" preform 966 appear in portion 1086B and co-aligned fibers 1082 from "lower" preform 966 appear in portion 1086C. The matrix is continuous throughout sections 1081 and 1084.

As is clear from FIGS. 10A and 10B, the length of each portion of a section does not necessarily correspond to the length of preform contributing fibers to that section (compare the length of portion 1082A of section 1081 with the length of preform 964). Furthermore, neither the thickness nor the width of a preform will necessarily correspond to the thickness or the width of a portion. The shape of a portion will, however, be influenced by the shape of the preform. Similar to the situation for "sections," the interface between adjacent "portions" might or might not be discernable.

A section can have the same composition or a different composition as an adjoining section. Regarding the latter situation, from section to section, the compositions can vary in terms of the matrix material composition, the fiber composition, content, and/or fiber distribution, as well as in any other compositional variable(s). Furthermore, adjoining sections can have the same or different fiber alignment.

The composition of section 1081 differs from that of section 1084. In particular, whereas portions 1082B and 1082C of section 1081 include fibers 1078, portions 1086B and 1086C of section 1084 include fibers 1082. This is further evidenced from FIGS. 10C and 10D, which depict respective transverse cross sections along axis A-A and axis B-B of FIG. 10B. A transverse cross section taken anywhere in section 1081 will appear as depicted in FIG. 10C. Similarly, a transverse cross section taken anywhere in section 1084 will appear as depicted in FIG. 10D. However, a transverse cross section of the interfacial area between sections 1081 and 1084 may look somewhat different than the transverse cross sections appearing in either FIG. 10C or 10D.

Figure 10E:
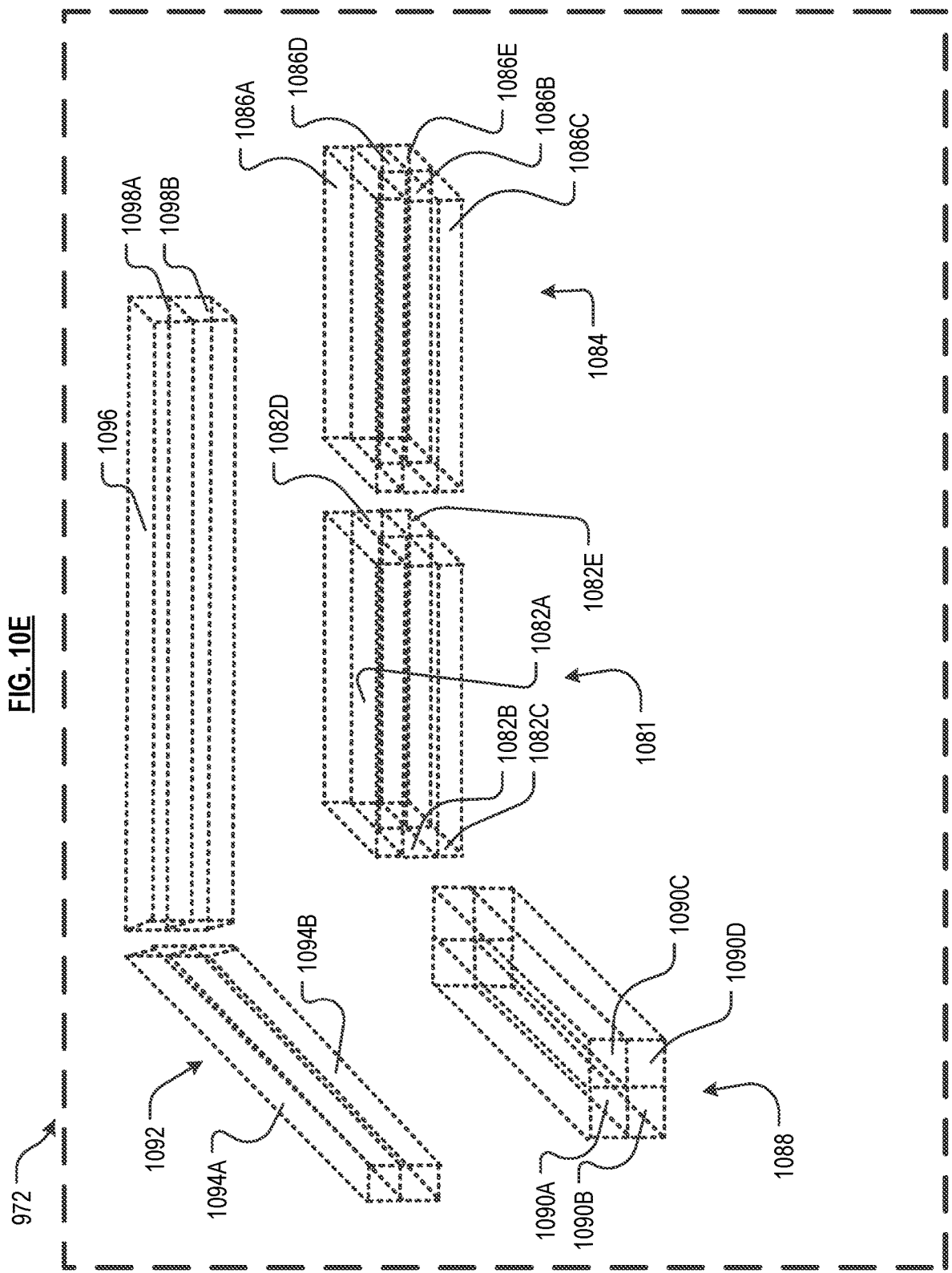
FIG. 10E depicts an exploded view of the part of FIG. 9C, showing sections and portions of the part.

It is to be understood that in addition to extending in a "vertical" direction and a "longitudinal" direction as depicted in FIG. 10B, a section can extend in a "transverse" direction as well. In the context of FIG. 10B, this would, for example, include additional portions adjacent to portions 1082A, 1082B, 1082C, and extending "into the page." This is depicted with more particularity in FIG. 10E.

FIG. 10E depicts an "exploded" view, by section, of part 972. The designation of sections is, to some extent, arbitrary, subject to the definition provided above. But the use of "sections" and "portions" as descriptors provides a useful pedagogical tool in conjunction in describing and defining embodiments of the invention, and serve to highlight the differences between parts made in accordance with the present teachings from those in the prior art.

In the embodiment depicted in FIG. 10E, five "sections" 1081, 1084, 1088, 1092, and 1098 are defined for part 1072. Sections 1081 and 1084 have been described in conjunction with FIGS. 9B and 10A-D. FIG. 10E additionally reveals that section 1081 includes portions 1082D and 1082E and section 1084 includes portions 1086D and 1086E, which portions were not depicted as being included in their respective sections in FIG. 10B. With reference to FIG. 9B, the preforms responsible for at least additional portions 1086D and 1086E are readily visible.

Part 1072 also includes section 1088, which includes portions 1090A through 1090D. Four preforms 962, which are depicted in FIG. 9B, are the source of material for these portions.

Sections 1092 and 1096 derive from stacked L-shaped preforms 960 (FIG. 9B). Although the fibers within preforms 960 are assumed to be continuous and co-linear, they give rise to two sections rather than one because the fibers sourced from these preforms and present in arm 974 and arm 976 are oriented orthogonally with respect to one another. Section 1092 includes portions 1094A and 1094B, and section 1096 includes portions 1098A and 1098B.

As previously disclosed, the fiber-bundle-based preforms that are the source of material for the various sections/portions of the part can, in accordance with the present teachings:
  (i) be formed, individually, in virtually any desired shape and/or size;
  (ii) vary, individually, in fiber and/or matrix material composition, as well as additives;
  (iii) maintain their shape and fiber orientation when placed in a layup; and
  (iv) be positioned freely and without materials-related limitations (such as tape and sheets) in a layup.

Because of capabilities (i), (iii) and (iv), embodiments of the invention provide a largely unencumbered ability to direct fiber and matrix materials from any given preform to an arbitrary volumetric region of a part being fabricated. Because of capability (ii), embodiments of the invention provide an unprecedented ability to tailor attributes/characteristics of a part. These capabilities, in combination, enable a manufacturer to fabricate fiber-composite parts having desired attributes/characteristics at arbitrary volumetric locations of the part. This should be readily apparent from FIG. 10E.

In light of the foregoing, it will appreciated that the methods described herein can be used to fabricate parts having different material properties in: (i) different sections of the part, (ii) different longitudinal portions of a given section of a part, and/or (iii) in different radial/depth locations of a given section of a part.

For example, with reference to FIGS. 10B-10E, at least some properties of section 1081 can be expected to differ from such properties of section 1084, due to the presence of different types of fibers in the two sections. And at least some properties of portion 1082B-1082E of section 1081 are expected to differ from such properties of portions 1086B-1086E of section 1084 due to the different fibers in those portions. For example, if fibers 1078 are carbon fiber, and fibers 1082 are fiberglass, the part can be expected to be weaker in portions 1086B-1086E than portions 1082A-1082E and 1086A. Furthermore, because of the continuity of the fibers between sections 1092 and 1096, as a consequence of the shape of preforms 960, the region at which the two arms 974 and 976 of part 972 intersect is expected to be stronger near the "outer" corner than the inner corner of the part (since the fibers are not continuous between sections 1088 and 1081).

The difference in properties can be functional, such as, for example, by imparting electrical conductivity to one or more sections of a part, such as through the choice of fiber, filler material, or the like. Or the differences can be mechanical, such as, for example, by imparting high mechanical strength to section(s) of a part by appropriate selection of fiber (e.g., carbon fiber, etc.) and/or by co-aligning all fiber in such sections, and/or by increasing fiber volume fraction.

Recalling the discussion of the preform external architecture and internal structure, and in light of the fact that the fiber-bundle-based preforms are the building blocks of parts in accordance with the present teachings, adjoining sections of a part can be colinear or non-colinear, co-planar or non-coplanar, fibers in the adjoining sections can be co-aligned or non-co-aligned, and uniformly or non-uniformly distributed.

Methods disclose herein, by virtue of the use of fiber-bundle-based preforms, are particularly well suited to fabricating complex parts, including those characterized by open volumes between and/or within solid sections of the part. FIGS. 11A through 11E depict non-limiting examples of open-framework parts (i.e., parts having open volumes).

FIG. 11A depicts frame 1100, having open central region 1102. FIG. 11B depicts lattice 1110 including open volumes 1112. FIG. 11C depicts lattice 1120 including open volumes 1122. FIG. 11D depicts truss 1130 having opening volumes 1132. And FIG. 11E depicts honeycomb 1140 including open volumes 1142.

It is to be understood that the disclosure describes a few embodiments and that many variations of the invention can easily be devised by those skilled in the art after reading this disclosure and that the scope of the present invention is to be determined by the following claims.

What is claimed:

1. A method for fabricating a fiber-composite part via compression molding, wherein the method comprises:
    forming a plurality of fiber-bundle-based (FBB) preforms, each FBB preform being a single bundle of continuous, co-aligned fibers impregnated with a thermoplastic resin and having a substantially circular cross section, each FBB preform characterized by an external architecture, wherein, within the plurality of FBB preforms, a first group includes FBB preforms that each have a first bend, defining a non-linear external architecture;
    forming a preform charge consisting of the plurality of FBB preforms by, prior to placement in a mold cavity, tacking together the plurality of FBB preforms, wherein the external architecture of the FBB preforms is maintained;
    placing the preform charge in the mold cavity;
    compression molding the preform charge, thereby consolidating the thermoplastic resin and the fibers from the FBB preforms; and
    cooling, in the mold cavity, the consolidated thermoplastic resin and fibers, fabricating a fiber-composite part.

2. The method of claim 1 wherein the FBB preforms of the first group include a second bend.

3. The method of claim 2 wherein the first bend and the second bend fall in a single plane, defining a non-linear and planar external architecture.

4. The method of claim 2 wherein the first bend and the second bend do not fall in a single plane, defining a non-linear and non-planar external architecture.

5. The method of claim 4 wherein the first bend falls in a first plane and the second bend falls in a second plane, wherein the first plane and the second plane are orthogonal with respect to one another.

6. The method of claim 4 wherein the first bend falls in a first plane and the second bend falls in a second plane, wherein the first plane and the second plane are not orthogonal with respect to one another.

7. The method of claim 3 wherein each FBB preform in the first group has a first end and a second end, and wherein respective first ends and second ends of each FBB preform in the second group are proximate to one another, defining a closed-form external architecture.

8. The method of claim 1 wherein within the preform charge, a second group of FBB preforms of the plurality thereof are linear.

9. The method of claim 3 wherein within the preform charge, a second group of FBB preforms of the plurality thereof have a linear and planar external architecture.

10. The method of claim 1 wherein forming a preform charge comprises arranging the plurality of FBB preforms so that the fiber-composite part comprises:
    (a) a first section having a first portion, wherein the first portion comprises the fibers sourced from a first FBB preform of the plurality thereof;
    (b) a second section having a first portion, wherein the first portion of the second section comprises the fibers sourced a second FBB preform of the plurality thereof; and
    (c) wherein the first section and the second section are contiguous;
    and the first FBB preform and the second FBB differ as to at least one of the following characteristics: (i) resin composition, (ii) fiber composition, (iii) fiber volume fraction, and (iv) the external architecture.

11. The method of claim 1 wherein forming a preform charge comprises arranging the plurality of FBB preforms so that the fiber-composite part comprises:
    (a) a first section having a first portion, wherein the first portion comprises the fibers sourced from a first FBB preform of the plurality thereof;
    (b) a second section having a first portion, wherein the first portion of the second section comprises the fibers sourced from a second FBB preform of the plurality thereof;
    (c) wherein the first section and the second section are contiguous; and
    (d) wherein by virtue of a difference in at least one characteristic between the first preform and second preform, the first section of the part is relatively stiffer than the second section of the fiber-composite part.

12. The method of claim 1 wherein forming a preform charge comprises arranging the plurality of FBB preforms so that the fiber-composite part comprises:
    (a) a first section having a first portion, wherein the first portion comprises the fibers sourced from a first FBB preform of the plurality thereof;
    (b) a second section having a first portion, wherein the first portion of the second section comprises the fibers sourced from a second FBB preform of the plurality thereof;
    (c) wherein the first section and the second section are contiguous; and
    (d) wherein by virtue of a difference in at least one characteristic between the first preform and second preform, the first section of the part is relatively more electrically conductive than the second section of the fiber-composite part.

13. The method of claim 1 wherein forming a preform charge comprises arranging the plurality of FBB preforms so that the fiber-composite part comprises:
    (a) a first section having a first portion, wherein the first portion comprises the fibers sourced from a first FBB preform of the plurality thereof;

(b) a second section having a first portion, wherein the first portion of the second section es the fibers sourced from a second FBB preform comprises of the plurality thereof;
(c) wherein the first section and the second section are contiguous; and
(d) wherein by virtue of a difference in at least one characteristic between the first preform and second preform, the first section of the part is relatively more thermally conductive than the second section of the fiber-composite part.

14. A method for fabricating a fiber-composite part via compression molding, wherein the method comprises:
forming a plurality of fiber-bundle-based (FBB) preforms, each a single bundle of co-aligned fibers impregnated with a thermoplastic resin and having a substantially circular cross section, and characterized by an external architecture, wherein at least some of FBB preforms of the plurality have a non-planar external architecture, having two bends that do not fall in a single plane;

placing the FBB preforms in a mold cavity, wherein the external architecture of the FBB preforms is maintained;
compression molding the FBB preforms, thereby consolidating the thermoplastic resin and the fibers from the FBB preforms; and
cooling, in the mold cavity, the consolidated thermoplastic resin and fibers, fabricating a fiber-composite part.

15. The method of claim 14 wherein prior to placing the FBB preforms in the mold cavity, they are tacked together to form a preform charge.

16. The method of claim 1 wherein each FBB preform is formed to have to have an application-specific length related to a size of the fiber-composite part.

17. The method of claim 14 wherein each FBB preform is formed to have to have an application-specific length related to a size of the fiber-composite part.

* * * * *